No. 828,444. PATENTED AUG. 14, 1906.
E. T. WADE.
REIN SUPPORT.
APPLICATION FILED JAN. 5, 1906.
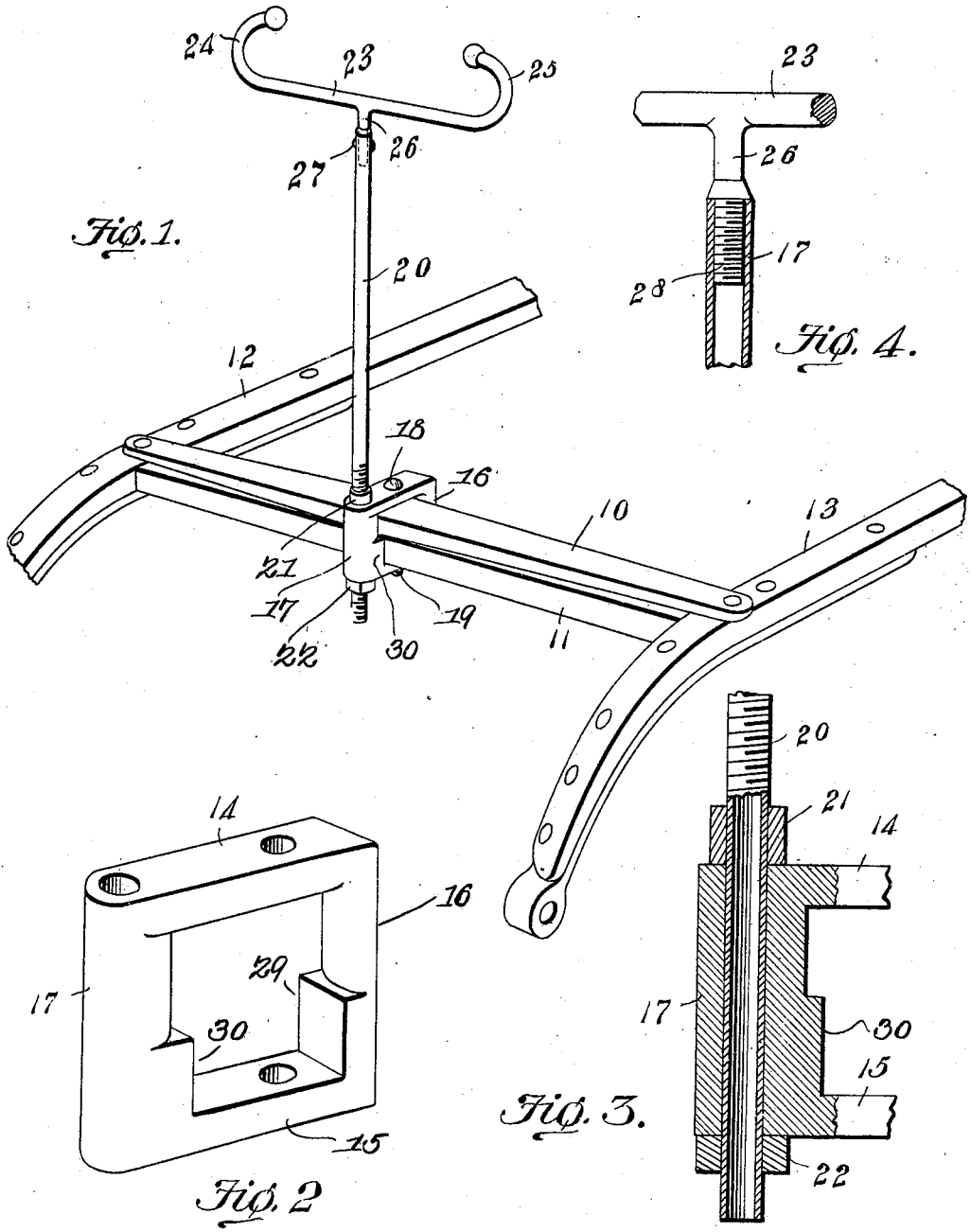
Edwin T. Wade,
INVENTOR
WITNESSES:
By C.A.Snow&Co
ATTORNEYS

UNITED STATES PATENT OFFICE.

EDWIN T. WADE, OF MAGEE, MISSISSIPPI, ASSIGNOR OF ONE-THIRD TO GEORGE W. JOHNSON, OF CURRIE, MISSISSIPPI.

REIN-SUPPORT.

No. 828,444.           Specification of Letters Patent.           Patented Aug. 14, 1906.

Application filed January 5, 1906. Serial No. 294,806.

*To all whom it may concern:*

Be it known that I, EDWIN T. WADE, a citizen of the United States, residing at Magee, in the county of Simpson and State of Mississippi, have invented a new and useful Rein-Support, of which the following is a specification.

This invention relates to driving rein-supporting attachments to vehicles, and has for its object to improve and simplify the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a perspective view of the improved device applied. Fig. 2 is a perspective view, enlarged, of the combined clip and supporting-frame. Fig. 3 is a sectional detail illustrating the adjusting portion of the device. Fig. 4 is a sectional detail of the rein-holder portion of the device.

The improved device is applied to the cross-bar which connects the thills of a vehicle and centrally of the same, or at the point where the whiffletree is attached, and replaces the usual clip whereby the whiffletree is coupled to the cross-bar.

The device is readily adaptable to any of the various forms and sizes of whiffletrees or swingletrees and cross-bars and for the purpose of illustration is shown applied to an ordinary form of such devices, the swingletree indicated at 10, the cross-bar at 11, and the thills at 12 13, respectively.

The improved device consists of an oblong frame formed of upper and lower members 14 15, forward connecting member 16, and a rear connecting member, the latter in the form of a tubular sleeve 17.

The member 14 bears above the swingletree 10, and the member 15 bears beneath the cross-bar 11, and the members are perforated to receive the pivot-bolt 18 of the swingletree, the bolt having a nut 19 upon its threaded end and bearing beneath the member 15.

Between the members 15 and 16 of the clip-frame a shoulder or stop 29 is formed, and between the members 15 and 17 of the clip-frame a similar stop-shoulder 30 is formed, the stop-shoulders bearing upon opposite sides of the cross-bar 11 and effectually preventing all swinging movement of the clip-frame upon the cross-bar.

The shoulders 29 30 do not extend into the path of the swingletree 10. Hence the swinging movement of the latter upon its pivot 18 is not effected by the presence of the clip-frame.

Slidably disposed through the sleeve portion 17 is a tubular rod 20, threaded at the lower portion and having a threaded sleeve 21, bearing upon the upper end of the sleeve portion 17, and a nut 22, bearing below the sleeve portion. By this means it will be obvious that the rod 20 may be vertically adjusted relative to the sleeve portion 17 and firmly supported thereon at any desired point.

Extending above the rod 20 is the rein-supporting member, consisting of a horizontal bar 23, having inwardly-curving ends 24 25 and with a central stud 26 projecting into the upper end of the rod 17 and secured in place in any suitable manner.

In Fig. 1 the stud is secured in place by a transverse pin or rivet 27, while in Fig. 4 the stud is threaded, as at 28, and adapted to engage the threaded interior of the tubular rod. The rod 17 is thus located rearwardly of the horse and adjustable vertically to bring the bar 23 above the line of the horse's back, so that the driving-reins will be so held that the tail of the horse cannot become entangled therein.

The device is simple in construction and can be readily adapted to horses of different sizes.

Having thus described the invention, what is claimed is—

1. In a rein-support, a clip formed with upper and lower members bearing respectively above the swingletree and beneath the cross-bar of the thills, a pivot-pin extending through said upper and lower members and likewise through the swingletree and crossbar, said upper and lower members connected forwardly of the swingletree and cross-bar by an integral member and connected rearwardly of the swingletree and cross-bar by an integral tubular sleeve, a threaded rod slidably disposed in said sleeve and carrying a rein-supporting means at the upper end, a stop-sleeve engaging the threaded portion of said rod and bearing above said tubular sleeve, and a nut engaging the threaded portion of said rod and bearing beneath said tubular sleeve.

2. In a rein-support, a clip formed with upper and lower members bearing respectively above the swingletree and beneath the cross-bar of the thills, a pivot-pin extending through said upper and lower members and likewise through the swingletree and crossbar, said upper and lower members connected forwardly of the swingletree and cross-bar by an integral member and connected rearwardly of the swingletree and cross-bar by an integral tubular sleeve, a threaded rod slidably disposed in said tubular sleeve and provided with a socket in the upper end, a rein-supporting member consisting of a horizontal bar having upturned and inwardly-curving terminals and with a central stud engaging said socket means for securing said stud therein, and means for adjustably connecting said rod in said tubular sleeve.

3. In a rein-support, a clip comprising a rectangular frame for embracing the cross-bar of the thills and the swingletree adapted to swing upon the same, the lower member of said frame having shoulders bearing against the sides of the cross-bar, a pivot-pin extending through said frame and the swingletree and cross-bar disposed therein, and a standard adjustable in said clip and provided with rein-supporting means.

In testimony that I claim the foregoing as my own I have hereto affixed my signature in the presence of two witnesses.

EDWIN T. WADE.

Witnesses:
E. N. WARE,
W. L. POLK.